United States Patent [19]

Hartmann et al.

[11] Patent Number: 4,967,627
[45] Date of Patent: Nov. 6, 1990

[54] PLATE SECTIONING SAW

[75] Inventors: Gerhard Hartmann, Ebhausen-Rotfelden; Burkhard Schwab, Calw-Alzenberg, both of Fed. Rep. of Germany

[73] Assignee: Holzma-Maschinenbau GmbH, Calw-Holzbronn, Fed. Rep. of Germany

[21] Appl. No.: 343,505

[22] Filed: Apr. 26, 1989

[30] Foreign Application Priority Data

Apr. 28, 1988 [DE] Fed. Rep. of Germany ....... 3814409

[51] Int. Cl.⁵ .............................................. B26D 7/18
[52] U.S. Cl. ...................................... 83/157; 83/419; 83/468.6
[58] Field of Search ............. 83/147, 157, 163, 477.2, 83/467 A, 419, 277, 468.6, 165, 166, 276

[56] References Cited

U.S. PATENT DOCUMENTS 4,445,409  1/1984  Mohr et al. ........................... 83/157

FOREIGN PATENT DOCUMENTS 2741955  3/1978  Fed. Rep. of Germany .

OTHER PUBLICATIONS

Brochure No. F 124/5.87/10 titled "Fixomat Squaring Equipment", from Holzma-Maschinenbau GmbH.

Primary Examiner—Douglas D. Watts
Assistant Examiner—Eugenia A. Jones
Attorney, Agent, or Firm—Dick and Harris

[57] ABSTRACT

A plate sectioning saw with a closing plate for controlling access to a discharge opening for the program controlled sectioning of sets of plates and separation of scrap and discard plates from the sectioned plates, is provided with an orienting device for aligning the sets of workpiece plates prior to sectioning.

5 Claims, 4 Drawing Sheets

PLATE SECTIONING SAW

BACKGROUND OF THE INVENTION

The present invention relates to a plate sectioning saw, and in particular, to a plate sectioning saw which has a machine support table with a plurality of table surface parts, a transfer table adjacent to the machine support table and a discharge aperture extending between one of the table surface parts and the transfer tables, parallel to the saw aperture. The present invention also relates to a plate sectioning saw which includes a closing flap for closing the discharge aperture, and an orienting device for aligning a stacked set of workpiece plates prior to sectioning. Such a plate sectioning saw is disclosed in Brochure No. F 124/5.87/10, titled "FIX-OMAT SQUARING EQUIPMENT", produced by Holzma-Machinenbau GmbH.

In such a plate sectioning saw as described above, the closing flap is activated in accordance with a program operational cycle, whereby the closing flap opens and closes alternately permitting and denying access to a discharge opening or discharge shaft. If workpiece plates, such as, for example, chipboard plates, are sectioned, then each chipboard plate is first trimmed in order to produce a reference edge. When the separating cut is made to produce the reference edge, the closing flap is swung down to its open position, and the discharge opening is thereby opened in order to save the scrap material which results from the cut performed to make the reference edge. As the workpiece plate is moved forward for the next sectioning cut, the scrap material is driven forward into the discharge aperture. Thereafter, the closing flap is directed back to its closed position, to enable the resulting subsequent plate part sections, which are cut away from the workpiece plate, to be moved over the closing flap to a successive processing station.

If several workpiece plates are to be sectioned on such a plate sectioning saw at the same time, the sectioning cut is usually accomplished by stacking the workpiece plates on top of one another into a set of workpiece plates. Before the first cutting of the stack, these plates are precisely aligned against a pushing unit of the feeding device. The pushing unit then feeds the stack of workpiece plates along a forward feed direction through the sectioning saw. In known prior art devices, the alignment of the stack of plates was accomplished through the use of special orienting devices which were placed on the body of the plate sectioning saw. The special orienting device pressed the set of plates, during the forward motion of the pushing device, against stop elements, which uniformly aligned the individual workpiece plates with respect to one another. In this way, the individual plates were aligned initially along their forward edges, with respect to the forward feed direction.

In order to align the workpiece plates snugly at their forward edges, the plate sectioning saw therefore had to be equipped with additional aligning devices, the manufacture and assembly of which correspondingly entailed additional costs.

It is accordingly an object of the present invention to provide a plate sectioning saw with a simplified construction, and method of operation, so that the need for special orienting devices is substantially reduced.

This and other objects of the invention will become apparent in light of the present specification, drawings and claims.

SUMMARY OF THE INVENTION

The present invention comprises a plate sectioning saw of the kind including a machine support table having a plurality of table service parts. A saw aperture extends between two of the table surface parts. A transfer table is arranged adjacent the machine support table. A discharge aperture is positioned between the machine support table and the transfer table, parallel to the aperture. The discharge aperture may be opened and closed by a closing flap which may be positioned in at least an opening position, a closing position and an engaging position. The plate sectioning saw also comprises an orienting device which has at least one catch, for enabling the alignment of a number of workpiece plates arranged together in a stack. In the present invention, the closing flap may be positioned in an upright, engaging position above the machine support table to act as the catch for the orienting device.

In a preferred embodiment of the invention, the closing flap may be positioned, by an activating device, into a first raised, inclined position, towards the stack of workpiece plates to be aligned. The upper side of the closing flap forms the catch surface. As the stack of workpiece plates are driven along the feed direction, they abut the closing flap, driving it into its upright, engaging position.

The feeding device includes a plate pushing unit, for driving the stack of workpiece plates along the feed direction. The plate pushing unit is equipped with clamp means for compressing the stack of workpiece plates as it is driven toward the closing flap for alignment.

BRIEF DESCRIPTION OF THE DRAWINGS

FIG. 4 also shows the closing flap, in phantom, in its lowered position opening the discharge aperture.

DETAILED DESCRIPTION OF THE DRAWINGS

Figure 1:
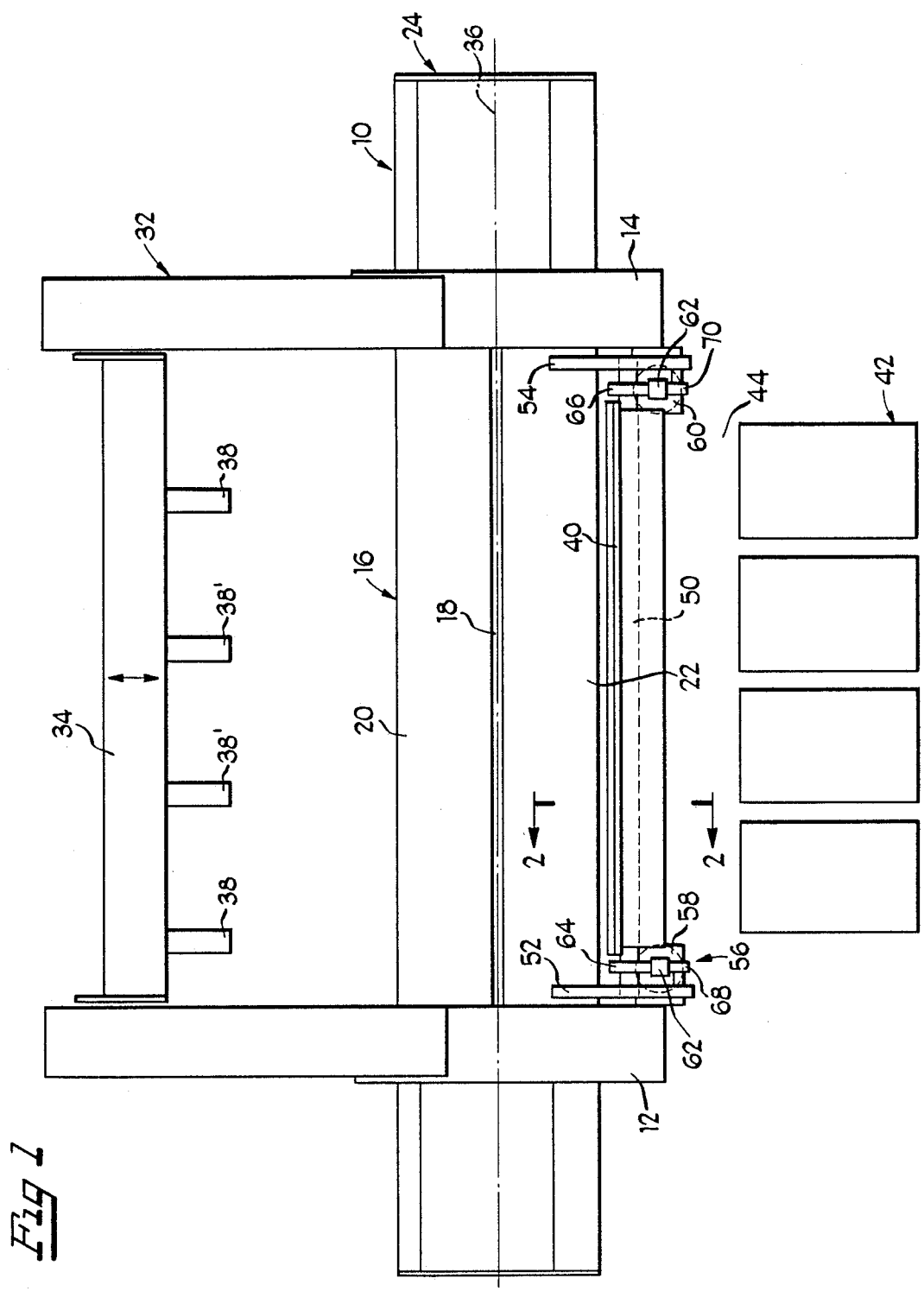
FIG. 1 is a top plan view of the plate sectioning saw according to a preferred embodiment of the invention, showing in particular the feeding device.

While the present invention is susceptible of embodiment in many different forms, there is shown in the drawings and will herein be described in detail, a specific embodiment, with the understanding that the present disclosure is to be considered as an exemplification of the principles of the invention and is not intended to limit the invention to the embodiment illustrated.

Figure 2:
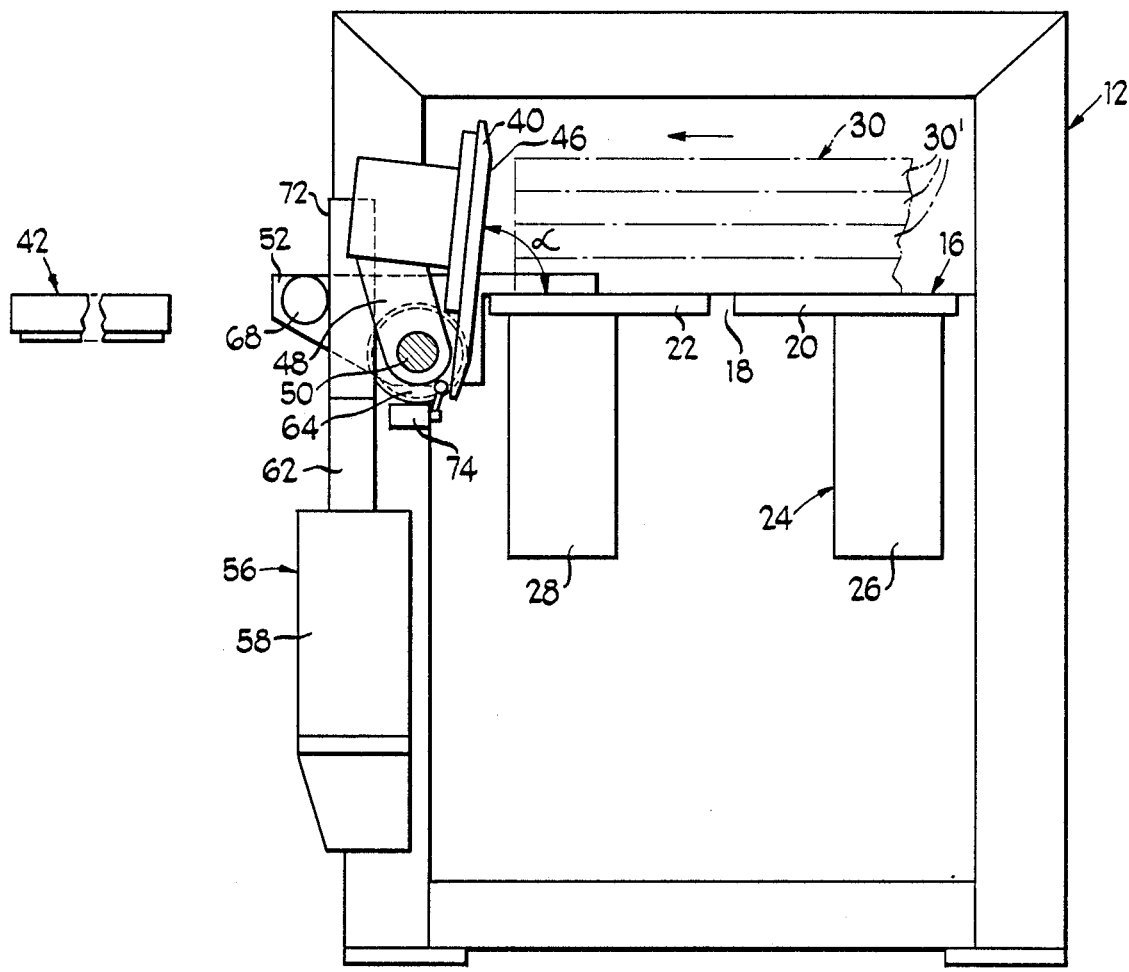
FIG. 2 is a side elevation in section of the invention as seen along line 2—2 of FIG. 1, showing the closing flap in its raised, inclined position.
Figure 3:
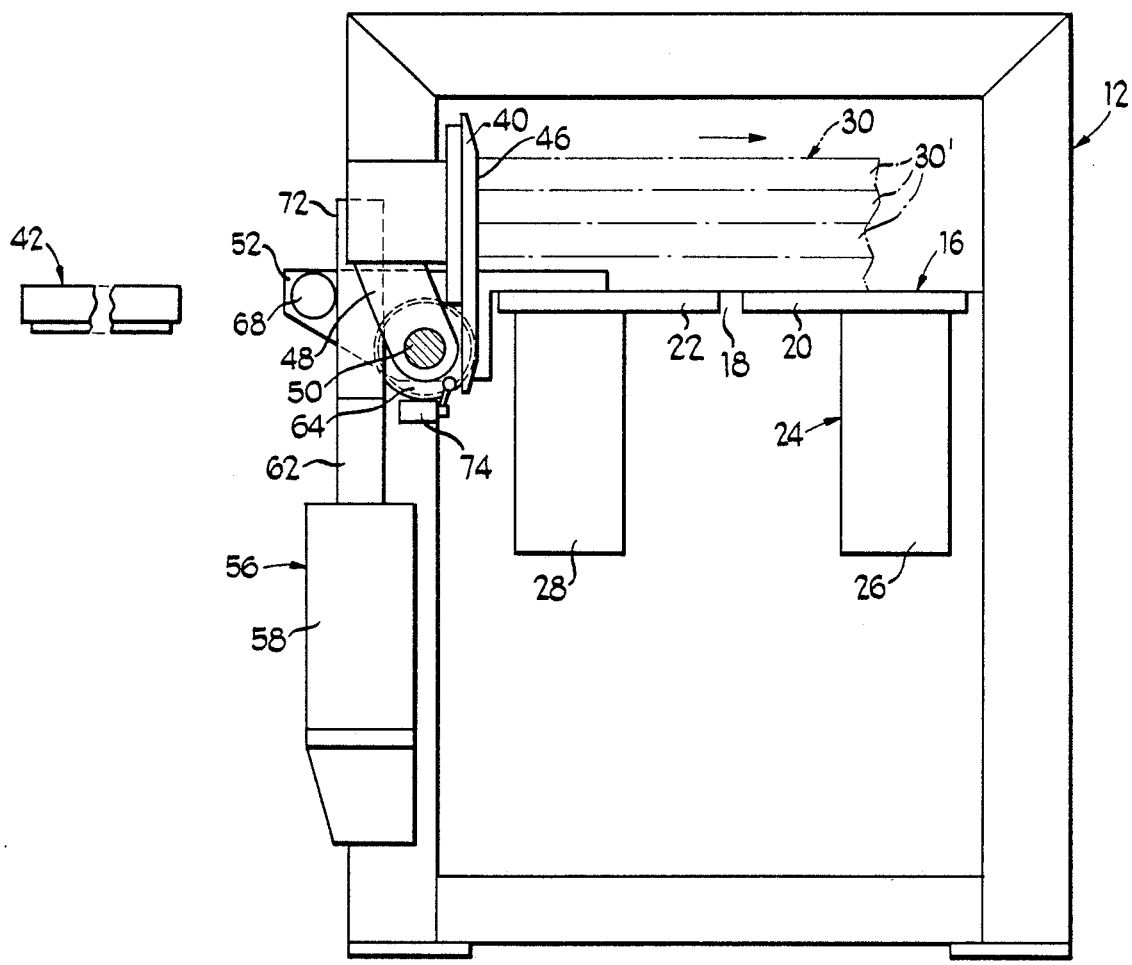
FIG. 3 is a side elevation in section of the invention according to FIG. 2, showing the closing flap in its upright position for the alignment of the group of workpiece plates.
Figure 4:
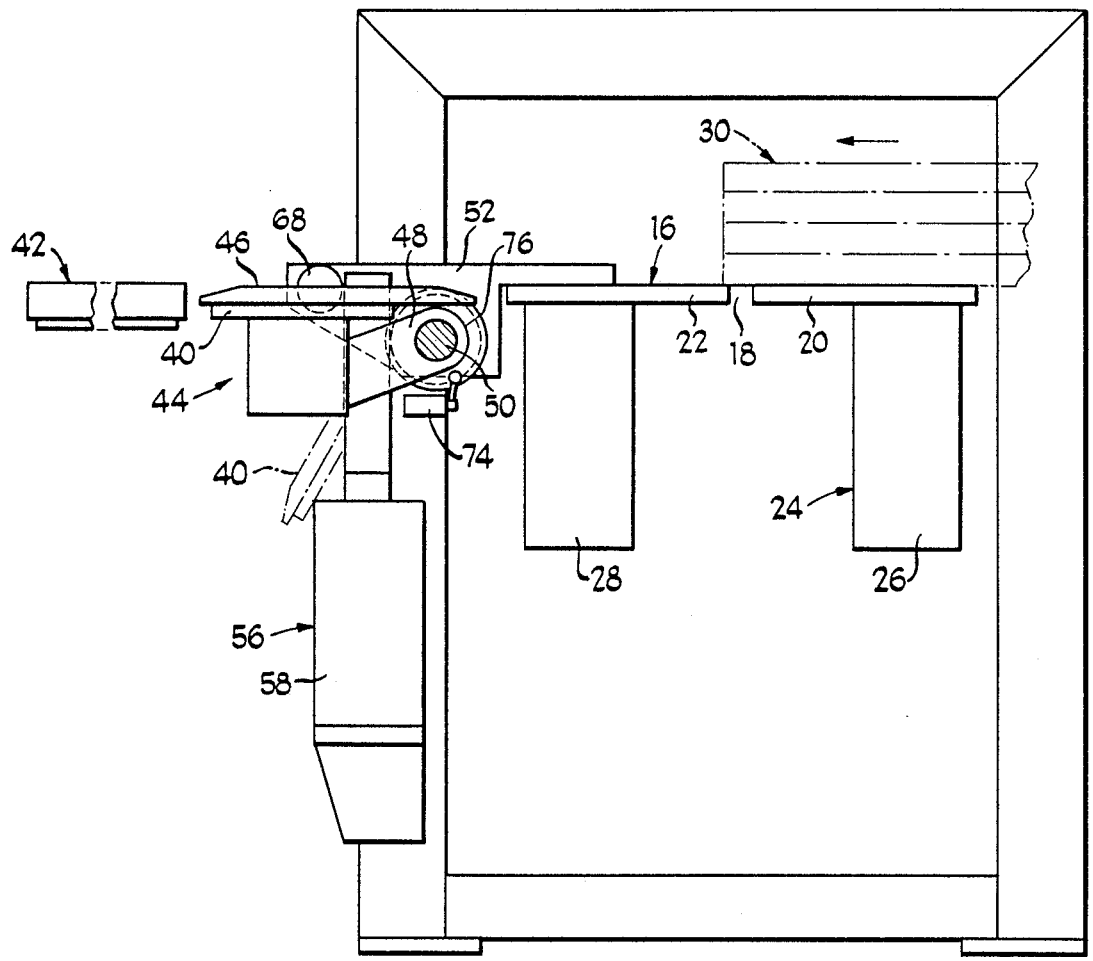
FIG. 4 is a side elevation in section of the invention according to FIG. 3 showing the closing flap in its horizontal position.

A plate sectioning saw according to the present invention is depicted in FIG. 1 and designated in its entirety by reference number 10. Plate sectioning saw 10 includes support table 16, which is positioned between two lateral support frames 12 and 14. Machine support table 16 includes two table slabs 20 and 22. Saw aperture 18 extends between table slabs 20 and 22 transversely to the direction of feed of the workpiece plates. The forward feed direction of plate sectioning saw 10 is from top to bottom, as seen in FIG. 1, right to left in FIGS. 2–4. Beneath table slabs 20 and 22, guide unit 24 extends between lateral mounting frames 12 and 14. Guide unit 24 is intended to support a sawing assembly (not shown) which would move beneath the machine support table 16, parallel to and beneath saw aperture 18. The sawing assembly might include, for example, a rough cutting saw blade and a circular saw blade. The sawing assembly would be conducted between guide plates 26 and 28 of guide unit 24. Since this type of guide unit is known in the prior art, its description and that of the sawing assembly has, for the sake of simplicity, been dispensed with herein. For the cutting of the workpiece plates, such as, for example, chipboards, as well as stacks of workpiece plates—whereby one such stack of workpiece plates is, in FIGS. 2 through 4, depicted in dotted lines and designated collectively by reference number 30, rough cutting and/or circular saw blades would project upwardly out of sawing aperture 18 of machine support table 16.

Forward feeding device 32, with the help of which individual workpiece plates or stacks of workpiece plates can be inserted into plate sectioning saw 10 for the purpose of sectioning, is connected to the feed side of plate sectioning saw 10. Forward feeding device 32 is provided, in a known manner, with a program-controlled plate pushing unit 34, which can be adjusted and clamped perpendicularly to separating plane 36, which is defined by sawing aperture 18. The direction of movement of plate pushing unit is indicated by the double arrow in FIG. 1. Plate pushing unit 34 is equipped with clamp members 38, which may be pneumatically actuated. Plate pushing unit 34 may also be equipped, if necessary, with plate catch units. Forward feeding devices of this type are known in the prior art.

On a workpiece discharge side of workpiece plate sectioning saw 10, there is associated with machine support table 16, closing flap 40 which extends parallel to the longitudinal edge of machine support table 16. Closing flap 40 opens up and closes off access to discharge aperture 44, which is positioned between machine support table 16 and transfer table 42, which is positioned in spaced relation to machine support table 16. Discharge aperture 44 is provided to facilitate the separation of scraps of workpiece plates, as well as discarded or defective plates, in a program-controlled manner. The separation of the discards and scraps from the trimmed workpiece plates is accomplished by causing closing flap 40 to swivel downwardly to its open position, a shown by the phantom lines in FIG. 4, whereby such scraps are, after entering discharge aperture 44, fed forward, downward and into, for example, a chipping device, for disposal of the scrap material.

Closing flap 40 is positioned, in its closed position, with the upper side of plate 46 aligned with and parallel to the upper sides of both table support plates 20 and 22 and of transfer table 42. By means of lateral support arms 48, only one of which is depicted in FIGS. 2 through 4, closing flap 40 is positioned in a non-rotating manner upon support shaft 50, which extends parallel to sawing aperture 18. Support shaft 50 is, for its part, supported in a rotatable manner with its ends supported by support flanges 52 and 53, which are attached to table support plate 22, as seen in FIG. 1.

In order to cause closing flap 40 to pivot, there is provided an actuating device, designated by its entirety by reference number 56. Actuating device 56 has, for example, two pivot cylinders 58 and 60, which are preferably operated pneumatically, and which are mounted in the end areas of support shaft 50 on lateral mounting frames 12 and 14. For each of pivot cylinders 58 and 60, piston rods 62 are partially constructed as toothed racks, which mesh with pinions 64 and 66, corresponding to pivot cylinders 58 and 60, respectively. Pinions 64 and 66 are affixed in a non-rotating manner on the ends of support shaft 50. Opposing rollers 68 and 70 are supported on support plates 52 and 54, respectively. Opposing rollers 68 and 70 roll on the surface sides of piston rods 62, opposite from pinions 64 and 66, and maintain secure engagement of piston rods 62 with their corresponding pinions 64 and 66.

Support shaft 50 is advantageously positioned below the upper side of the plate table plate 22 so that when closing flap 40 is in its closed position, the upper side of plate 46 if closing flap 40 is coplanar with the upper sides of table supporting plate 22 and transfer table 42 (see FIG. 4).

Terminal switch 74 is fixed to the framework of plate sectioning saw 10 and operably arranged with one of support arms 48, with which there is arranged switching cam 76, for example, on one of support arms 48. Terminal switch 74 could also, of course, cooperate with a control cam, which can be provided on another part, rotating upon activation of closing flap 40, for example, on support shaft 50 or pinion 64. The operation of terminal switch 74 will be discussed in further detail below.

Plate sectioning saw 10 is also equipped with an aligning device, with the help of which the plate or sets of plates can be precisely oriented against plate pushing device 34. This aligning device has a catch, which, in the present construction, is formed by closing flap 40. FIG. 3 depicts the engagement position of closing flap 40, which is a vertical position directed upwardly and projecting over machine support table 16. One particular feature of the present invention is that before closing flap 40 is directed to its vertical engagement position (FIG. 3), closing flap 40 is first brought into a position which is inclined toward a stack of workpiece plates 30 to be aligned, as seen in FIG. 2. Accordingly, an acute angle (alpha) indicates the position of plate 46 of closing flap 40, with respect to the upper side of machine support table 16. This position offers the advantage that, in order to align, for example, the stack of workpiece plates 30, as the stack of workpiece plates 30 is moved, by plate pushing unit 34, against closing flap 40 at a relatively great thrusting speed, individual plates 30' of the stack of workpiece plates 30 successively come into contact with closing flap 40. The separate successive impacts of the individual plates 30' against closing flap 40 tends to reduce the overall impact, so that closing flap 40 may be swiveled against the pressure of pivoting cylinders 58 and 60 into its engagement position as shown in FIG. 3.

A further advantage of the present invention is that the swiveling movement of closing flap 40 into its vertical engagement position is used to actuate the drive of plate pushing unit 34 in order to interrupt the motion of plate pushing unit 34 The actuation of the drive of plate pushing unit 34 in this manner is accomplished by terminal switch 74 and switching cam 76. Through this means, a precise stopping point for the feeding device is obtained so that excess stressing of the parts of activating device 56 defining the vertical engagement position of closing flap 40 can thereby be avoided.

The swiveling of closing flap 40 into its closed open and engagement positions can naturally take place with another suitable activating device, such as, for example, by using an adjusting motor. The activating device 56 which is depicted in the present invention is characterized, however, through its particular simplicity and operating reliability.

Plate sectioning saw 10 operates in the following manner:

If, for example, one stack of workpiece plates is to be sectioned, then closing flap 40 is, in a manner controlled by program, moved upwards into the feeding position depicted in FIG. 2. Then, plate pushing unit 34 moves stack of workpiece plates 30 against closing flap 40, in particular against the upper side of plate 46, and is subsequently set into action, closing flap 40 is swiveled back into its vertical engagement position as depicted in FIG. 3. Through this means, all workpiece plates 30' positioned above one another are oriented against catch unit 38' of plate pushing unit 34. This takes place while plate pushing unit 34 is in motion. As soon as the vertical position of closing flap 40 is reached, the forward feeding movement is stopped by means of terminal switch 74. The clamping grips 38 of plate pushing unit 34 are closed, and closing flap 40 is swiveled downwardly into its open position (seen in phantom in FIG. 4), in order to open access to discharge aperture 44.

Thereafter, stack of workpiece plates 30 is once more retracted and, corresponding to a present control program for the sawing assembly, stack of workpiece plates 30 is positioned on separating plane 36. After the first cut is made, stack of workpiece plates 30 is moved along the forward feed direction by plate pushing unit 34 into the next cutting position, whereby, during the feeding movement, the resultant cutting scraps are pushed into discharge aperture 44. Since, however, stack of workpiece plates 30 is positioned above closing flap 40, closing flap 40 moves into its horizontal closing position as depicted in FIG. 4, in order to cut off access to discharge aperture 44 so that the gap between machine support table 16 and transfer table 42, onto which the sections of stack of workpiece plates 30 are to be moved, is substantially bridged over.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A plate sectioning saw of the kind including a machine support table having a plurality of table surface parts, a saw aperture extending between a first pair of said table surface parts, a discharge aperture for the removal of cutting scraps extending parallel to said saw aperture between a second pair of said table surface parts, said discharge aperture being substantially openable and closable by a closing flap positionable by an activating device to at least an opening position and a closing position, said closing flap in said closing position forming a support surface enabling transport of workpiece plates past said discharge aperture of said plate sectioning saw, said plate sectioning saw being further of the kind comprising:

said closing flap being positionable in an upright engaging position above the surface of said machine support table to form an orienting device against which a group of workpiece plates may be aligned for sectioning as a group.

2. The invention according to claim 1 wherein said closing flap is positionable by said activating device into an upright, inclined position, an upper surface of said closing flap forming a stop surface against which said group of workpiece plates are driven by a feed device, said closing flap being thereafter driven into said upright engaging position to enable said alignment of said group of workpiece plates.

3. The invention according to claim 2 wherein said feed device further comprises:

plate pushing means for driving said group of workpiece plates along a feed direction; and gripping means for compressing said group of workpiece plates while said workpiece plates are being driven along said feed direction.

4. A plate sectioning saw of the kind including a machine support table having a plurality of table surface parts, a saw aperture extending between a first pair of said table surface parts, a discharge aperture for the removal of cutting scraps extending parallel to said saw aperture between a second pair of said table surface parts, said discharge aperture being substantially openable and closable by a closing flap positionable by an activating device to at least an opening position and a closing position, an upper facing surface of said closing flap in said closing position providing a support surface enabling transport of workpiece plates past said discharge aperture of said plate sectioning, said plate sectioning saw being further of the kind comprising:

said closing flap further being positionable by said activating device in a first upright, inclined position away from said discharge aperture, said upper facing surface of said closing flap further forming a stop surface against which a group of workpiece plates are driven by a feed device;

said closing flap further being positionable, by said group of workpiece plates into an upright engaging position above said machine support table when said workpiece plates are driven by said feed device so as to form an orienting device against which said group of workpiece plates may be aligned for sectioning as a group.

5. The invention according to claim 4 wherein said feed device further comprises:

plate pushing means for driving said group of workpiece plates along a feed direction; and gripping means for compressing said group of workpiece plates while said workpiece plates are being driven along said feed direction.

* * * * *

UNITED STATES PATENT AND TRADEMARK OFFICE
CERTIFICATE OF CORRECTION

PATENT NO. : 4,967,627

DATED : November 6, 1990

INVENTOR(S) : Gerhard Hartmann and Burkhard Schwab

It is certified that error appears in the above-identified patent and that said Letters Patent is hereby corrected as shown below:

Col.3, Line 54   Delete "a shown by" and instead insert --as shown by--

Signed and Sealed this

Eighth Day of September, 1992

Attest:

DOUGLAS B. COMER

*Attesting Officer*   *Acting Commissioner of Patents and Trademarks*

UNITED STATES PATENT AND TRADEMARK OFFICE
CERTIFICATE OF CORRECTION

PATENT NO. : 4,967,627

DATED : November 6, 1990

INVENTOR(S) : Gerhard Hartmann and Burkhard Schwab

It is certified that error appears in the above-identified patent and that said Letters Patent is hereby corrected as shown below:

Col. 4, Line 65    Delete "unit 34 The" and instead insert --unit 34. The--

Signed and Sealed this

Seventeenth Day of August, 1993

Attest:

BRUCE LEHMAN

Attesting Officer    Commissioner of Patents and Trademarks